Nov. 18, 1952          G. W. LYNN          2,618,149
TROWEL DEVICE FOR PLASTERING MACHINES
Filed Oct. 14, 1947
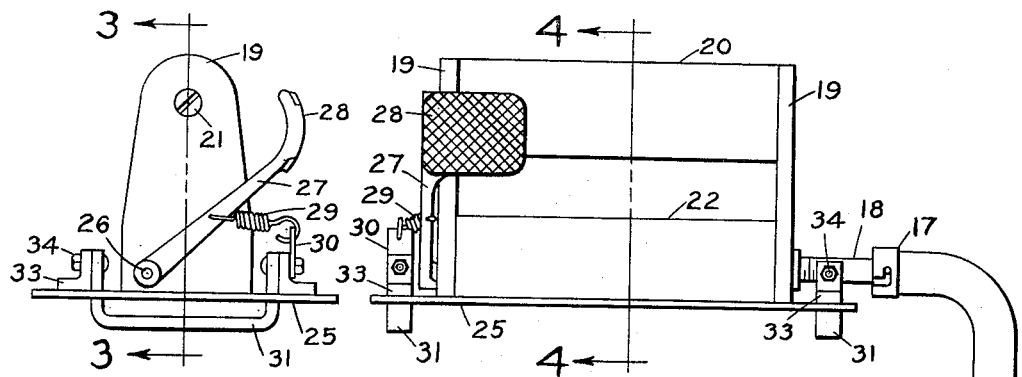
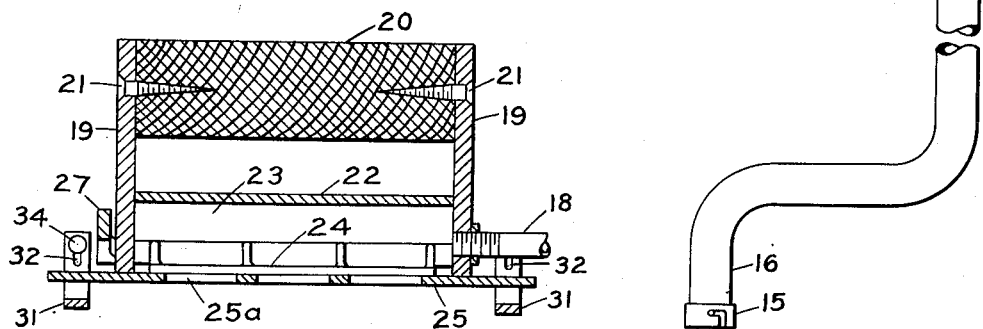
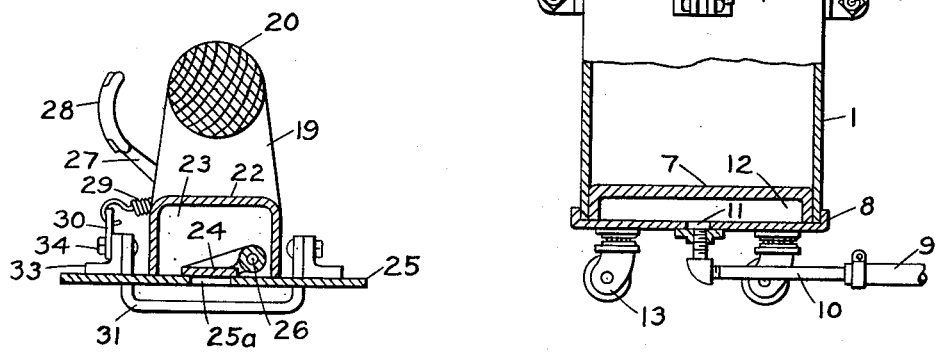
INVENTOR.
George W. Lynn
BY    *Samuel H. Davis*
ATTORNEY

Patented Nov. 18, 1952

2,618,149

UNITED STATES PATENT OFFICE 2,618,149

TROWEL DEVICE FOR PLASTERING MACHINES

George W. Lynn, Fowlerville, Mich.

Application October 14, 1947, Serial No. 779,756

1 Claim. (Cl. 72—130)

This invention relates to machines, is particularly concerned with plastering machines, and is most particularly concerned with a plastering machine by the use of which plaster is applied on the walls and ceiling of a building and thereby eliminating the use of prior manual methods of such plaster application.

The prior method of plaster application on walls and ceilings of a building whereby resort is had to ordinary trowels and other such tools is labor consuming and is for that reason costly. The high cost of manual application of such plaster is made more expensive by the loss of material which takes place in the falling of the said plaster during the process of application.

I have for several years concentrated my efforts on the design of machines by the use of which such manual operation could be eliminated and the cost of the operation could be decreased and have now discovered and invented a plastering machine whereby I am able to accomplish the same.

It is an object of this invention to provide a machine whereby plaster can be applied on inside surfaces such as walls and ceilings of a building with the use of a minimum amount of manual labor. It is a further object to provide a machine whereby the application of the plaster is extremely fast. It is still a further object to provide a machine whereby the application of plaster is accomplished with substantially no loss of the plaster due to dropping.

I have now discovered and invented a plastering machine comprising a tank, means for adding plaster thereto, means for admitting compressed air through the bottom thereof, a piston disk contained therewithin, and capable of being vertically raised and lowered by admitting and removing compressed air to the space therebeneath, the said raising of the piston disk causing the plaster contained in the tank to be forced upwardly, a trowel, a trowel mechanism having a manually operated valve, and the said trowel having a slit for the passage of plaster therethrough, and am now able to avoid the disadvantages of the prior art and am able readily to accomplish the objects set forth.

Referring to the drawings:

Fig. 1 is a front view of the plaster tank and the trowel mechanism.

Fig. 2 is a side view of the trowel mechanism.

Fig. 3 is a longitudinal view of this invention taken along the line 3—3 of Fig. 2.

Fig. 4 is a transverse view of the trowel mechanism taken along the line 4—4 of Fig. 1.

The tank 1 has a cover 2. The cover 2 can be removed by removing the nuts 5 from the bolts 3. The bolts 3 are threaded at one end and have a hole near the other end, and are rotatably attached to the extensions on the upper side of the tank. The said bolts 3 are held to the said extensions by the bolts 4. The split angles 6 are welded to the said cover 2. The piston disk 7 is slidably contained in the tank 1 and is capable of vertical movement upon the admission of compressed air to the space therebeneath, and the release of the compressed air from the said space. The pipe 10 is passed through a hole 11 in the bottom 8, the said bottom 8 is welded to the tank 1, and the said pipe 10 extends to the air hose 9. The said hose 9 leads to an air compressor (not shown). The casters 13 are mounted on ball bearing swivels and allow for ease in the movement of the plastering machine.

The trowel 25 has a plurality of slots 25a. The closure plate 24 covers the said slots 25a when the passage of plaster therethrough is not desired. The closure plate 24 is opened and closed by the knurled thumb pad 28 and the lever 27. The said lever 27 is fastened through the end supports to the shafting 26 on which the closure plate 24 is mounted. The spring 29 is attached to the lever 27 and is also attached to the anchor 30. The said spring 29 causes the closure plate 24 to close the slots 25a when the thumb is removed from the pad 29. The depth gauge 31 is movably fastened to a short length of angle iron 33. The said angle iron is welded to the trowel 25. The bolt 34, passing through a hole in the iron 33, a hole in the anchor 30, and a hole in the gauge 31, serves in holding the gauge at the desired position. The casing 22 is connected by the pipe 18. The said pipe 18 is in turn connected to the hose 16 by means of the coupling 17. The said hose 16 is connected to the pipe 14 by the coupling 15. The casing 22 forms the plaster holding compartment 23. The handle 20 is rigidly held by the end supports 19, and these supports are rigidly fastened to the trowel 25 by means of the screws 21. The slots 32, shown in Fig. 3, aid in adjusting the gauge 31 to the desired position.

The operation of the plastering machine is simple and little experience by a novice is needed. The cover 2 of the plaster holding tank is removed and plaster is loaded thereinto. The said cover is replaced and secured by the nuts and bolts attached to the extensions on the side of the tank. Compressed air is admitted into the chamber 12 which forces upwardly the piston disk and the plaster contained thereabove. The plaster is forced to flow upwardly through the pipe 14, the tube 16, the pipe 18, and into the compartment 23. During the upward passage of the plaster the closure plate 24 is opened to allow the escape of the air contained in the pipes, the tube and in the said compartment. When it is desired to start the plastering the thumb pad 28 is pressed toward the handle 20 which opens the closure plate 24, forcing the plaster outwardly through the slots 25a in the trowel. The desired thickness of the plaster applied in this manner is determined by the depth at which the gauges 31 are set. When the plaster contained in the tank 1 is exhausted the air contained in the space beneath the piston disk 7 is released by opening a valve (not shown) on the compressor.

I wish particularly to point out that the size of the tank of my plastering machine may be of such capacity as is most convenient to the operator. For example, if the job is an all day job a larger tank is more convenient.

I wish further particularly to point out that although I have shown my invention as having only one trowel attachment, I am able, if the need be, to attach any number of such trowel mechanism, depending on the number of men that might wish to work at the same time. It is obvious that I am able to do so by allowing for additional outlets such as designated by the numeral 14.

I claim:

A trowel device for a plastering machine comprising a plaster holding compartment, inlet means for passing the plaster into the said compartment, a trowel plate forming the lower wall of the compartment, and having a plurality of aligned slots therein, a lever, the said lever being secured to a closure plate, the said closure plate being pivoted at its ends to the walls of the compartment in alignment with the said slots and in close proximity thereto, whereby it covers the said slots when in closed position and can be pivoted by operating the said lever to open the said slots.

GEORGE W. LYNN.

REFERENCES CITED

The following references are of record in the file of this patent:

UNITED STATES PATENTS

| Number | Name | Date |
| --- | --- | --- |
| 1,125,146 | Maskrey et al. | Jan. 19, 1915 |
| 1,390,011 | Bliven | Sept. 6, 1921 |
| 1,828,738 | Hood | Oct. 27, 1931 |
| 2,104,086 | Lines | Jan. 4, 1938 |
| 2,198,271 | McCallum | Apr. 23, 1940 |
| 2,236,737 | Stone | Apr. 1, 1941 |
| 2,341,691 | Ciceske | Feb. 15, 1944 |

FOREIGN PATENTS

| Number | Country | Date |
| --- | --- | --- |
| 375,741 | Germany | May 18, 1923 |